United States Patent [19]
Wilson et al.

[11] 3,788,466
[45] Jan. 29, 1974

[54] IMPACT SENSOR AND CODER APPARATUS
[75] Inventors: David G. Wilson, Cambridge, Mass.; Ora E. Smith, Cincinnati, Ohio
[73] Assignee: Massachusetts Institute of Technology, Cambridge, Mass.
[22] Filed: Oct. 10, 1972
[21] Appl. No.: 296,396

Related U.S. Application Data
[62] Division of Ser. No. 120,857, March 4, 1971.

[52] U.S. Cl............................ 209/79, 73/12, 73/79, 324/161, 209/111.9
[51] Int. Cl. .............................................. B07c 5/34
[58] Field of Search ......... 209/79, 111.9; 73/79, 12; 324/161, 163

[56] References Cited
UNITED STATES PATENTS
| | | | |
|---|---|---|---|
| 3,669,261 | 6/1972 | Moulin............................... | 73/79 X |
| 3,557,603 | 1/1971 | Carr...................................... | 73/12 |
| 3,453,862 | 7/1969 | Elliott et al......................... | 73/79 X |
| 2,912,105 | 11/1959 | Allured et al....................... | 209/79 |
| 3,498,117 | 3/1970 | Dalrymple........................... | 73/79 |

Primary Examiner—Richard A. Schacher
Assistant Examiner—Gene A. Church
Attorney, Agent, or Firm—Arthur A. Smith, Jr.; Martin M. Santa; Robert Shaw

[57] ABSTRACT

Impact sensor and coder apparatus for use in a materials-sorting system. The embodiment described in greatest detail includes a movable rigid body adapted to strike individual pieces of the materials. An accelerometer associated with the rigid body measures the rate of deceleration of the rigid body, as a function of time, in terms of a voltage signal waveform. The waveform thus derived is compared with a group of typical waveforms to determine which of the waveforms of the group conforms most closely to that of the sample, thereby to identify the sample.

4 Claims, 9 Drawing Figures

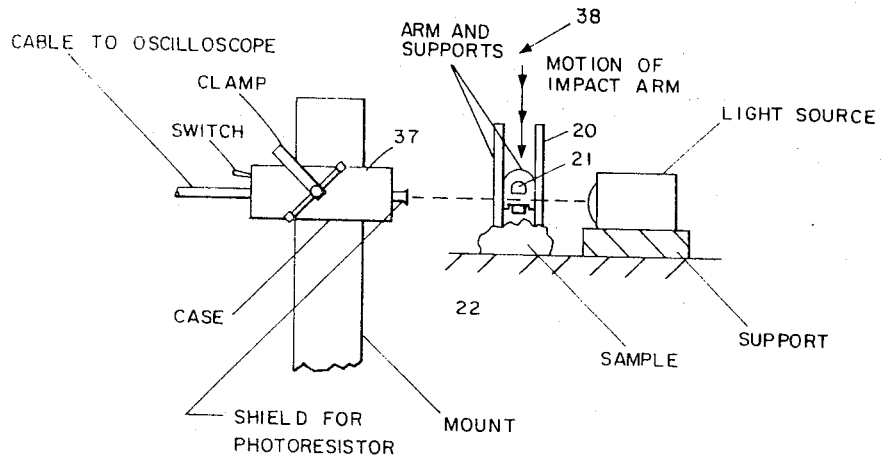
FIG. 7
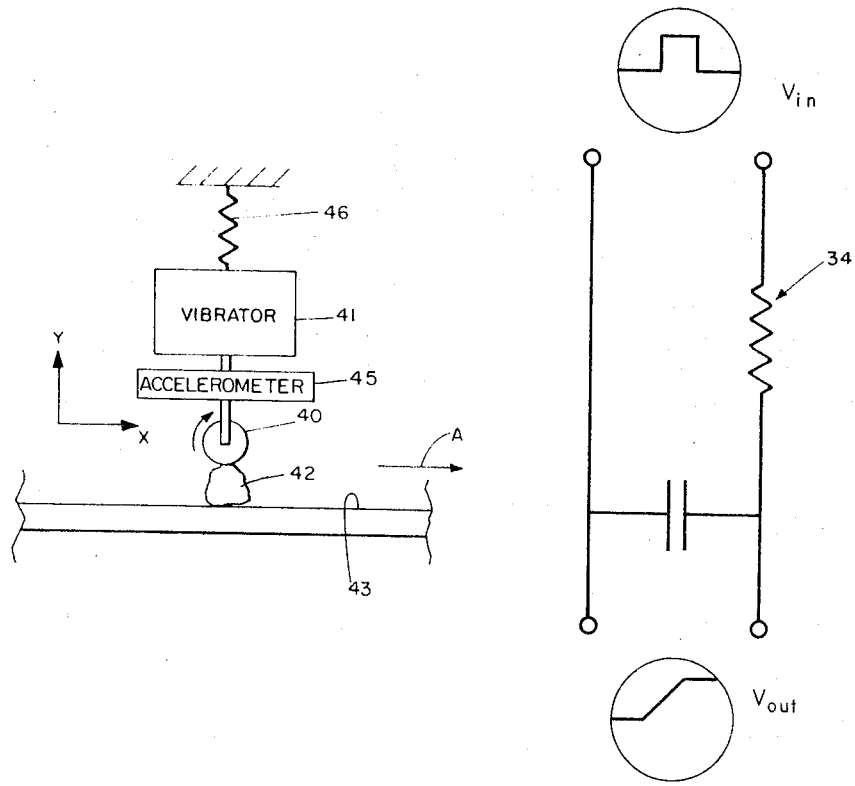
FIG. 9
FIG. 8

3,788,466

IMPACT SENSOR AND CODER APPARATUS

This is a division of application Ser. No. 120,857, filed Mar. 4, 1971, and is being filed as a result of a requirement for restriction.

The invention herein described was made in the course of contracts with the United States Public Health Service, Department of Health, Education and Welfare.

The present invention relates to impact sensor and coder apparatus particularly useful in connection with coding in a materials-sorting system, and, in particular, to apparatus particularly adapted for analyzing refuse for the purpose of sorting such refuse.

The concept herein disclosed is discussed in some aspects in a thesis entitled "Investigations of Methods for Mechanically Sorting Mixed Refuse," by the inventor Smith, working under the supervision of the inventor Wilson; the thesis was deposited in the library system at Massachusetts Institute of Technology on July 16, 1970. The writer discusses, in detail, background material relating to a number of sorting systems used in industry as well as particular aspects of refuse sorting. A method of sorting is discussed also in an application for Letters Patent filed herewith by the inventor Wilson and entitled "Vortex Classifier (now U.S. Pat. No. 3,739,910, granted June 19, 1973)."

Any sorting process consists of two basic operations: coding and switching. In many instances, coding and switching are non-separable, as in a typical magnetic sorter wherein the ferromagnetic property constitutes "coding" and the fact that a piece of ferromagnetic material adheres to a magnet constitutes "switching." Sorting operations can be divided into three categories: manual sorting, machine-assisted sorting, and machine sorting. These three categories may be thought of as successive generations of technological sophistication, but the requirements of a particular situation may necessitate their complementing one another. The present invention is described herein in connection with automatic sorting—although it has applicability in the other sorting systems, as well.

In any totally automatic sorting system the most difficult problem is the design of sensors to provide sufficient information for accurate coding. Solid-refuse sorting is particularly difficult because of the total lack of homogeneity of any sort, be it geometric, material, or other. Municipal refuse includes everything from old engine blocks to fish heads wrapped in newspaper. Part of any automated refuse-sorting problem revolves around whether it is better to pulverize (i.e., shred, mill or comminute) the refuse to some extent before subjecting it to sensor scrutiny. Pulverization provides some advantages by introducing a certain degree of geometric homogeneity into the refuse flow by limiting the size range of refuse particles. However, pulverization is costly in terms of power and requires a very high flow rate past the sensors if a sizable amount of refuse is to be handled. Sensor configuration greatly influences the decision to pulverize or not to pulverize. Sensor function has been deemed to be the most important phase of the study of an automated solid-refuse sorting system; so, much time has been spent in the investigation of various approaches to the problem of sensor function.

Accordingly, the principal object of the present invention is to provide a sensor for separated but unpulverized refuse, the sensing being effected by physical contact between the sensor and the refuse.

Another object is to provide a sensor for use in automated solid-refuse sorting systems.

A further object is to provide a sensor which provides a signature-type indication of the particular refuse being sensed and means for analyzing the signature to achieve a coding function.

Still another object is to provide sensor and coder apparatus of more general use as well.

These and other objects are discussed in the following description and are particularly defined in the appended claims.

By way of summary, the objects of the invention are attained by a method of coding materials in a sorting system, that comprises establishing relative movement between a particular sample of the material and a rigid body and effecting impact therebetween. The pattern of deceleration is measured as a function of time and the moving element, whether it be the particular sample or the rigid body, due to resistance established by the particular sample, and that pattern of deceleration is compared with a group of pre-established patterns of deceleration of typical materials to determine which of the patterns of deceleration of the group conforms most closely to that of the sample. The time-rate of deceleration in the particular apparatus described herein appears as a waveform of a signal which can be a voltage output signal and which can be fed to a digital computer, pattern-recognition device or the like, or other means wherein it can be compared with waveforms of typical types of materials usually encountered. Some action can then be taken upon the sample as a result of the comparison.

The invention is discussed hereinafter upon reference to the accompanying drawing, in which.

Figure 4:
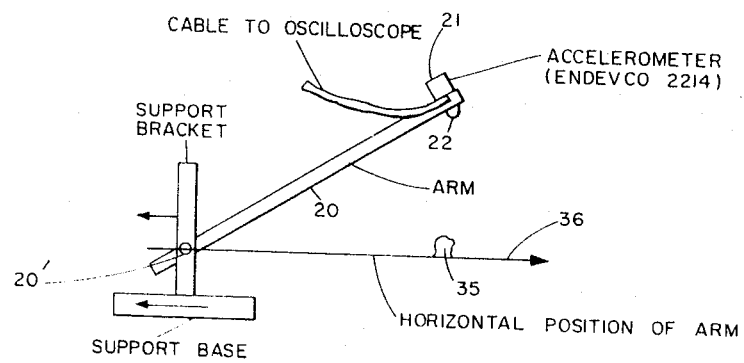
FIG. 4 is a side view of an impact sensor for use in apparatus employing the present teachings.
Figure 5:
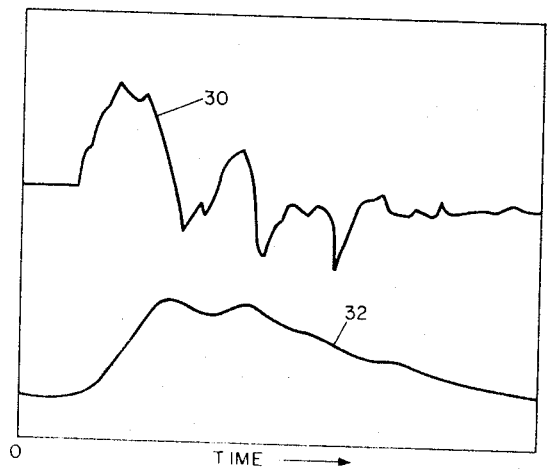
FIG. 5 shows a typical impact signature for a steel can, the upper curve representing deceleration vs. time, and the lower curve representing velocity vs. time.
Figure 6:
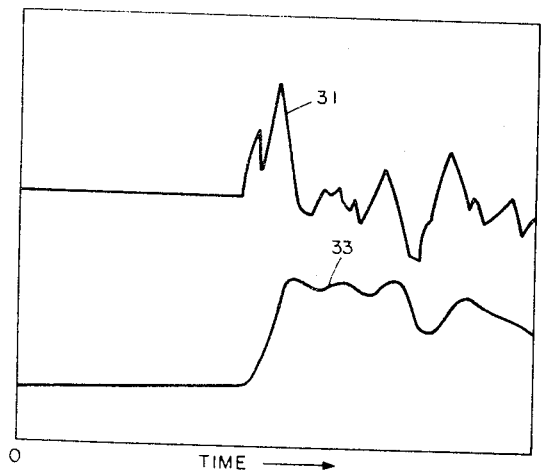

FIG. 6, like FIG. 5, shows impact signatures, but in FIG. 6 the representation is for an aluminum sample, the representations in both of FIGS. 5 and 6 being each reproductions of photographs of actual oscilloscope tracings made for the respective materials;

FIG. 7 is a partial view of the impact sensor of FIG. 4 and shows a scheme for triggering the oscilliscope used to produce the tracings shown in FIGS. 5 and 6;

FIG. 8 is a schematic representation of an RC integrator used in conjunction with the oscilloscope to provide the upper tracings in FIGS. 5 and 6; and FIG. 9 is a schematic of a modification of the impact sensor shown in FIG. 4.

There follows a short discussion by way of background. Until quite recently the trend in America has been to regard natural resources as expendable and inexhaustible; however, the enormous growth of the economy in this century has brought with it a host of environmental problems. One of the most pressing of these problems concerns the manufacture-use-discard cycle toward which industry and the consumer are oriented. The immediately obvious effect of using natural resources to their depletion is the resulting hardship due to lack of materia. The less obvious effects are the disturbances produced by the discard of these materials after their use; but the results of polluting a river, or filling an area with garbage are just as undesirable as denuding a hillside of its trees.

Unfortunately, the use of reclaimed materials has not been popular because of political, economic, and psychological reasons. Most consumers have not realized that irreversible pollution of the environment with discards and the near-exhaustion of many resources has become a certainty if action is not taken. Industry has not seen fit to utilize secondary sources of materials to a large extent because such utilization has not been economically attractive.

Reclamation will be ultimately necessary. To make it economically feasible now it must compete in cost with alternative disposal methods which vary from area to area. It is most likely that an automated sorting facility will be more expensive than disposal in rural regions but less expensive than disposal in high-population-density urban areas where incineration pollutes the air and landfill space is unavailable. In addition, whether or not reclamation is widely accepted depends upon whether or not a market for secondary materials can be created.

Figure 1:
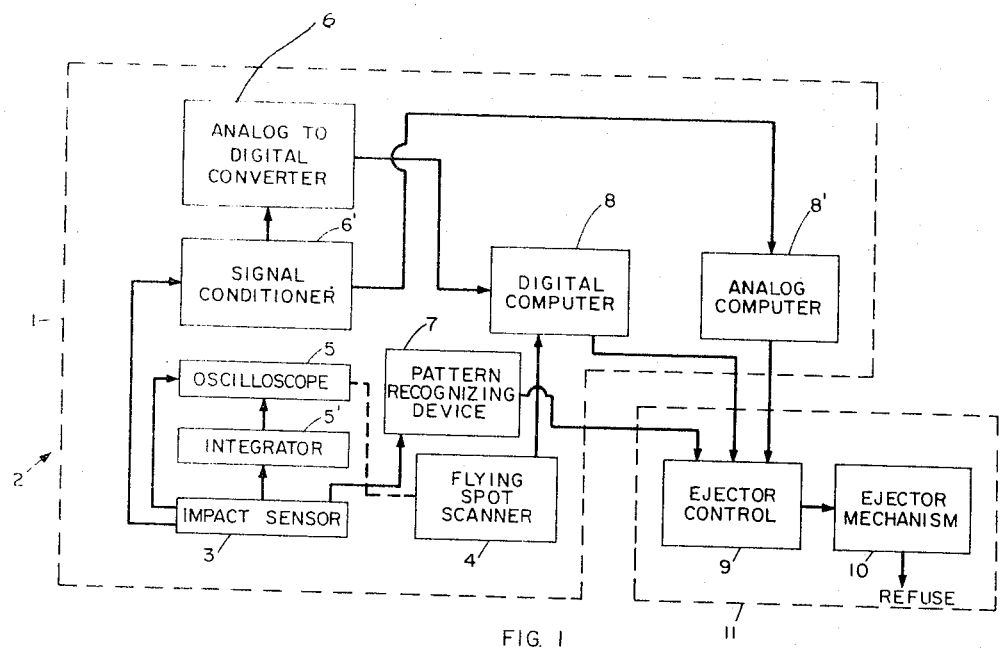
FIG. 1 is a block diagram of a materials-sorting system and includes both coding and switching aspects of such system.
Figure 2:
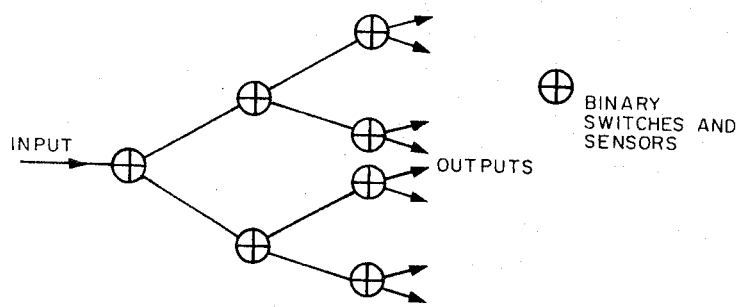
FIG. 2 shows, schematically, a binary sorting system.
Figure 3:
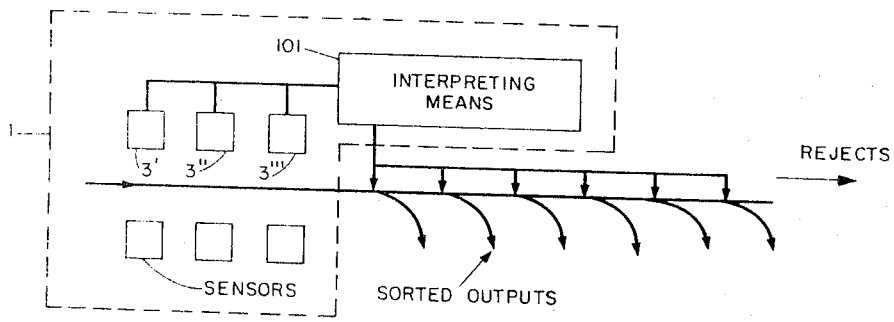
FIG. 3 shows, schematically, a series sorting system.

Turning now to the drawing, there follows, first, a brief overall discussion of the invention with reference to FIG. 1 wherein a coder is shown at 1 for use in a materials-sorting system shown, generally, at 2. For purposes of the present discussion, the coder 1 includes some means for providing impact between the material being sorted and an impact device to provide an output signal (i.e., sensing) and some means for analyzing or interpreting the output signal. In FIG. 1 the coder 1 is shown to include, in diagrammatic form, an impact sensor 3 which, as later discussed herein, may be an accelerometer which provides an output voltage signal that bears a relationship to the time history of deceleration of the impacted material. The voltage signal can be fed to an oscilloscope 5 for analysis by, for example, a flying-spot scanner 4. The output of the flying-spot scanner 4 is shown connected to a digital computer 8 which, in turn, supplies a control signal to an ejector control 9 of the switch or ejector portion labeled 11 of the sorting system 2. The ejector control 9 operates an ejector mechanism 10 which determines the location to which any particular piece of refuse, or other material being sorted is sent. The output from the impact sensor or pick-up can, on the other hand, be fed to a signal conditioner 8' which is connected to an analog-to-digital converter 6 and, thence, to the computer 8 or to an analog computer 8', and thence, to the control 9. The signal conditioner 6' can contain analog circuits which will extract from the signal waveform the parameters for subsequent analysis. Such device can include, for example, integrators, differentiators, peak samplers, comparators, etc. The signal alternatively, can be connected to a pattern-recognizing device 7 (e.g., an optical gate for a range of waveforms) which, in turn, is connected to the control 9. The system in FIG. 1 may be part of the binary system of FIG. 2 or the series sorting system of FIG. 3, the latter of which shows a plurality of sensors 3', 3'', 3''' etc., all or any one of which may be of the present type, being fed to an interpreting means 101 and, thence, to the ejector switches for control of the actual sorting. The present system is quite well adapted for use in the series system. There follows in the next several paragraphs a discussion of a particular form of impact coder and this is the form of coder discussed in said thesis.

The system discussed in greatest detail herein and reported in said thesis is an impact-signature method. In one form of this technique a pivot arm 20 in FIG. 4 with an accelerometer 21 and impact tool 22 rigidly attached to the end opposite the pivot, is dropped onto a sample 35 of the material in question with sufficient force plastically to deform the sample, the sample 35 being carried in the direction of the arrow by a belt 36. The resulting output of the accelerometer 21 is a voltage signature which is a function of the time history of the deceleration experienced by the impact arm 20. The signature contains information from a deformation process separable into three parts: deformation of the impact tool 22, accelerometer 21, arm 20 and supporting structure; gross deformation of the sample (buckling, ringing, crunching); and deformation at the impact tool-deformed material interface.

In order to eliminate as much as possible the effects of support deformation, the impact arm should be of high rigidity/mass ratio. The material selected for the arm in the thesis work was 5⁄8-inch o.d. 3/32-inch wall admiralty bronze; however, the arm material is not important as long as rigidity is obtained. The arm used was made approximately 18 inches long to allow an impact velocity of about 4 ft/sec to be obtained during a drop of the arm from a position in which the accelerometer tip of the arm was 9 inches above the horizontal. The arm was flattened at the accelerometer end, and an Endevco model 2214 piezoelectric accelerometer attached to the arm by means of a threaded stub (not shown in detail in FIG. 4). The threaded stub had pressed into the impact end of it a hardened-steel ball bearing 1⁄8 inch in diameter and which is the impact tool 22 above-discussed. The arm 9 can be isolated from the support by a rubber grommet or other means 20' to remove extraneous signals from traveling to the accelerometer from the support.

Observation of two typical impact signatures, e.g., FIGS. 5 and 6, shows that distinct variations are visible to the eye when signatures of different materials and configurations are compared. Assuming that a sample can be identified from its signature, two basic approaches suggest themselves. In one approach, given various physical properties of the material under test, certain features or combinations of features of the signature may be hypothesized as being produced by those unique combinations of properties. This approach involves the development of a model of the impact process. A survey of the literature of plastic deformation with emphasis upon dynamic deformation shows that the impact test as performed is difficult to model. The impact process is multidimensional and time varying. Additional complexities arise involving more than one mode of deformation, as, for example, in the case of impact upon a can, deformation occurs both in the region indented by the impact tool and in a region of "crumpling" extending for many impact-tool diameters around the impact site. Moreover, the behavior of composite materials and thin materials lying on different background materials are not easily taken into account analytically. For the above mentioned reasons, a complex analytic model of the impact process was not attempted.

The second approach to identification based upon impact signatures involves ignoring the physical processes completely and selecting those features or characteristics of a signature that change with sample variations. Useful waveform parameters of characteristics, for example, for such identification include time to maximum deceleration, energy absorbed to maximum deceleration, time to zero deceleration, energy absorbed to zero deceleration, initial deceleration, maximum deceleration and distance traveled to maximum deceleration. Such parameters can be analyzed in a properly programmed digital computer 8 or an analog computer. In this connection, reference can be made to a paper entitled "New Sensors For the Automatic Sorting of Municipal Solid Waste," Senturia et al., wherein there is discussed a program whereby a computer can develop a suitable algorithm for processing said parameters to make possible the classification decision automatically.

However, in order to evaluate the impact technique quickly and accurately it was decided in connection with said work to record as much information as possible from photographs of oscilloscope-displayed signatures. To display first impact, the externally triggered photoelectric arrangement shown at 38 in FIG. 7 was used. In the arrangement shown a trigger box 37 contains a Schmitt trigger, not shown in the drawing. A photoresistor also in the trigger box acts as the input to the trigger. When the photocell resistor value is changed it causes the trigger to change states, resulting in a voltage spike which triggers the oscilloscope which is set in the single-sweep mode of operation.

To measure the energy expended up to the time of peak deceleration it is necessary to construct an integrator. Since the signature is a curve of deceleration versus time, its first integral is a velocity curve. Looking at FIGS. 5 and 6, the upper traces 30 and 31, respectively, represent deceleration versus time, while the lower traces, 31 and 33, respectively, represent velocity versus time. The integrator shown at 5' in FIG. 1 can be a simple RC integrator of the type labeled 34 in FIG. 8. The integrator 5' is connected into the oscilloscope circuit to provide the curves 32 and 33 and by-passed for the curves 30 and 31.

The coding system in FIG. 9 embodies a rotatable cylinder 40 which acts as the impact tool. The cylinder, which is solid, vibrates up and down in response to action of a vibrator 41 upon a sample 42, the vibrations being transferred through a moving belt 43 to a further rotatable cylinder 44 and thence to an accelerometer 45, as before. The vibrator 41 moves in the Y direction in response to the mechanism shown schematically as a spring 46. Thus, as the cylinder 40 rolls over the sample material 42, the vibrations are transmitted therethrough to the accelerometer. Impact in the form of such vibrations is measured by the accelerometer and again the rate of deceleration as a function time is measured.

Further modification of the invention herein described will occur to persons skilled in the art and all such modifications are deemed to be within the spirit and scope of the invention.

What is claimed is:

1. A method of coding and sorting materials in a sorting system, that comprises, striking particular samples of the material with a moving rigid body, measuring the rate of deceleration as a function of time of the rigid body due to resistance established by the particular sample struck and providing an output voltage signal pattern that bears a relationship to the time history of deceleration of the particular sample struck, comparing the pattern of deceleration in connection with the particular sample struck with a group of pre-established patterns of deceleration to determine which of the patterns of deceleration of the group conforms most closely to that of the sample, and switching the sample struck to the group to which its pattern most closely conforms thereby to effect sorting of the materials.

2. A method of coding and sorting materials in a sorting system, that comprises, striking particular samples of the material with a rigid body, measuring the deceleration of the rigid body due to the resistance established by the particular sample struck in terms of waveform, comparing the characteristics of the waveform of the particular sample struck with a group of typical characteristics of waveforms to determine which of the waveform characteristics of the group conforms most closely to that of the sample, providing an output signal determined by which of the group of typical characteristics the characteristics of the waveform of the particular sample struck conforms, and sorting the sample on the basis of said output signal.

3. A method of coding and sorting materials in a sorting system, that comprises, establishing relative movement between particular samples of the material and a rigid body and effecting impact therebetween, measuring the rate of deceleration of the rigid body due to resistance established by the particular sample, comparing the rate of deceleration in connection with the particular sample struck with a group of pre-established rates of deceleration of typical materials to determine which particular rates of deceleration of the group conforms most closely to that of the sample, providing a control signal indicative of the group of materials to which the sample belongs, said control signal being established on the basis of the particular rates to which the sample most closely conforms, and sorting the sample on the basis of said control signal.

4. A method of coding and sorting samples in a sorting system, that comprises, effecting relative motion between a sample to-be-analyzed and an acceleration-measuring device, effecting impact between the sample and the acceleration-measuring device, determining the resistance to deformation of the sample by measuring the time history of deceleration of the moving body, and comparing the time history of deceleration in connection with the particular sample with a group of pre-established time histories of deceleration of a group of known materials to determine which of the time histories of deceleration of the group conforms most closely to that of the sample, providing a control signal determined by the time history of the pre-established time histories to which the time history established by the particular sample most closely conforms, and sorting the samples on the basis of said control signal.

* * * * *